United States Patent [19]

Jenkins

[11] Patent Number: 5,220,882
[45] Date of Patent: Jun. 22, 1993

[54] PET TREATMENT DOOR

[76] Inventor: Thomas S. Jenkins, P.O. 2769, Lake Isabella, Calif. 93240

[21] Appl. No.: 787,878

[22] Filed: Nov. 5, 1991

[51] Int. Cl.⁵ .......................................... A01K 17/00
[52] U.S. Cl. ...................................... 119/17; 119/19
[58] Field of Search ............. 119/15, 17, 19; 49/402, 49/483, 485, 504

[56] References Cited

U.S. PATENT DOCUMENTS

| | | | |
|---|---|---|---|
| 3,237,599 | 3/1966 | Torrey et al. | 119/19 |
| 3,985,102 | 10/1976 | Yonezawa | 119/19 |
| 4,016,833 | 4/1977 | Ray | 119/17 |
| 4,183,323 | 1/1980 | Maines | 119/19 |
| 4,365,590 | 12/1982 | Ruggieri et al. | 119/17 X |
| 4,526,133 | 7/1985 | LoMaglio | 119/17 |

Primary Examiner—Gene Mancene
Assistant Examiner—Thomas Price
Attorney, Agent, or Firm—Richard C. Litman

[57] ABSTRACT

A door and door frame enabling the conversion of a pet cage such as a Shoreline cage into an anesthetic or oxygen therapy chamber. The door frame is mounted on the cage using the same bolts as are used in the construction of the cage. The door and door frame are formed of acrylic plastic material, the door being hinged to the door frame. The door frame includes spacers to enable a tight seal with the cage. The door includes a gas inlet port and outlet port, a slidable latch to latch the door shut, a sealing gasket, and a pair of vents with slidable air tight covers. With the vents covered gas can be introduced into and vented from the cage. With the vents uncovered, the cage can be used as a normal ventilated cage for an animal.

4 Claims, 2 Drawing Sheets

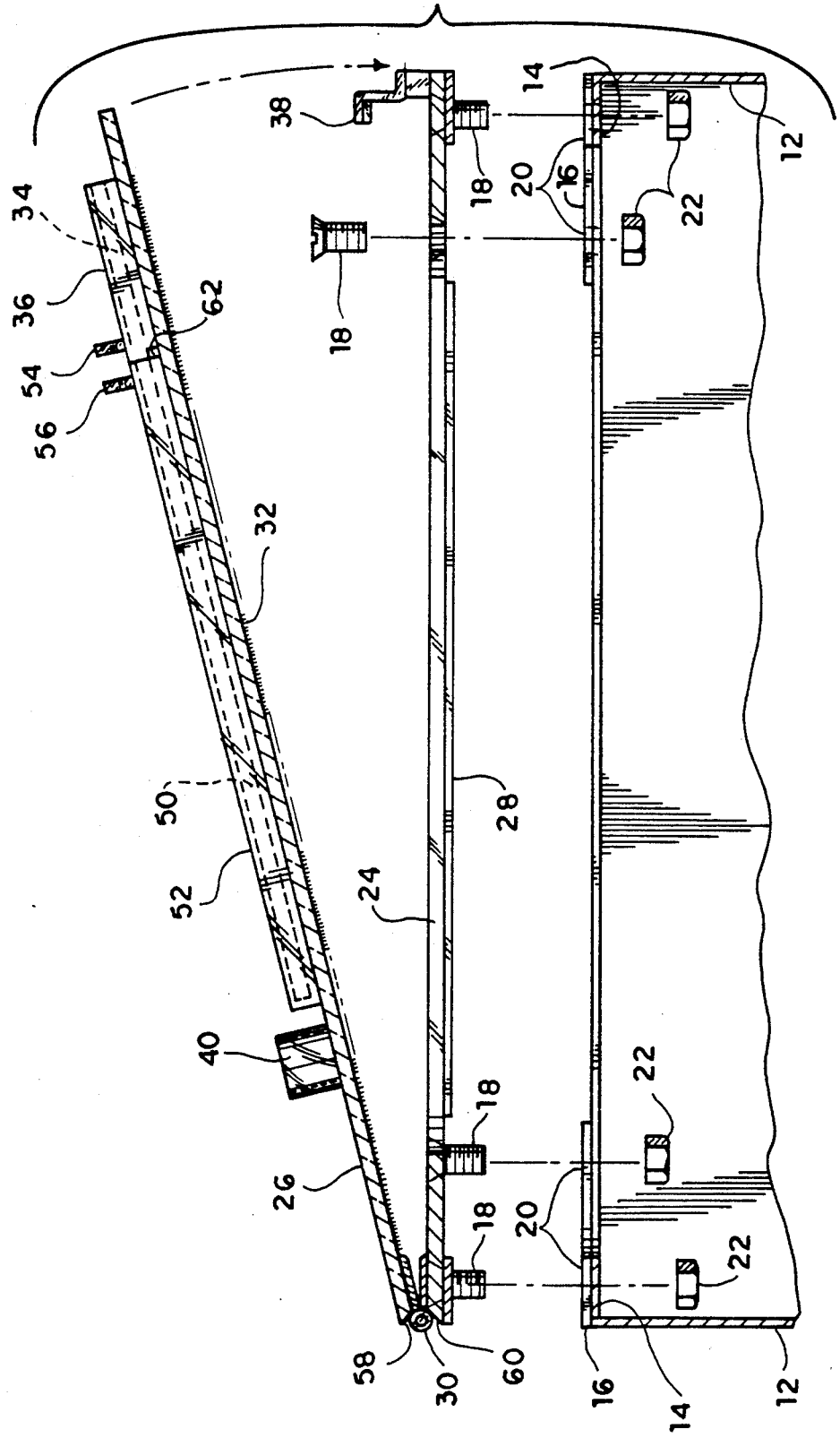

PET TREATMENT DOOR

BACKGROUND OF THE INVENTION

1. Field Of The Invention

This invention relates to an acrylic door provided to convert a conventional pet cage such as a Shoreline cage into an anesthetic chamber or oxygen therapy chamber. The door can also be used as a regular cage door, requires no modification of the Shoreline cage, and can be installed with a screwdriver. When installed the cage is converted into a gas tight chamber, whereby anesthetic gasses or oxygen can be safely introduced and vented from the chamber through inlet and outlet ports, or alternatively, vent covers can be removed to provide adequate ventilation enabling the cage to be utilized as a normal cage.

In private veterinary clinics, universities, and research facilities, it often becomes necessary to anesthetize an animal prior to surgical procedure. Often this requires the transfer of the animal from one cage to another. If the animal is upset this may increase the chances that the handler will be bitten or scratched. Also, in prior art cages, there has always been the danger that gases might escape from the cages and inhaled by the handler. The disclosed invention allows a smaller cage containing the animal to be inserted into a larger cage equipped with the inventive door which then can be shut, and thereafter the anesthetic gases can be introduced and vented safely without endangering the handler who can then safely remove the animal for whatever procedure is needed. The use of the inventive door reduces patient stress, reduces staff injuries, and in addition reduces patient recovery times.

2. Description Of The Related Prior Art

Sealed cages with means for the introduction of a variety of gases into the cages are well known in the prior art. Representative examples include U.S. Pat. Nos. 3,356,087, issued to Yolan Guttman on Dec. 5, 1967; 3,830,201, issued to John Coulburn on Aug. 20, 1974; 4,202,676, issued to Michael H. Pelosi, Jr. et al. on May 13, 1980; 4,305,347, issued to David R. Hemenway et al. on Dec. 15, 1981; 4,582,055, issued to James N. McDougal et al. on Apr. 15, 1986; 4,941,431, issued to Francis G. Anderson et al. on Jul. 17, 1990; and 5,003,922, issued to Motohiro Niki et al. on Apr. 2, 1991. U.S. Pat. No. 3,985,102, issued to Shoji Yonezawa on Oct. 12, 1976, discloses a cage formed of transparent glass or plastic resin, the cage including slidable covers covering apertures and openings. U.S. Pat. No. 4,233,780, issued Nov. 18, 1980 to John H. Royce et al., and U.S. Pat. No. 5,001,866, issued Mar. 26, 1991 to Anthony D. Powell et al. disclose gasket arrangements for doors. U.S. Pat. No. 4,365,590, issued Dec. 28, 1982 to Albert P. Ruggieri et al., U.S. Pat. No. 4,402,280, issued Sep. 6, 1983 to William R. Thomas, and U.S. Pat. No. 4,526,133, issued Jul. 2, 1985 to F. Leo Lo Maglio disclose ventilated animal cages. U.S. Pat. No. 4,384,376, issued May 24, 1983 to June O. Shrode, and U.S. Pat. No. 4,895,400, issued Jan. 23, 1990 to George W. Harding et al., disclose door latching means.

SUMMARY AND OBJECTS OF THE INVENTION

None of the foregoing patents disclose, either separately or in combination, a transparent acrylic door which may be mounted on a cage such as a Shoreline cage with only a screwdriver, to transform the cage into a gas tight sealed unit with inlet and outlet gas ports, the door further including airtight sliding covers which may be moved to expose two vents so as to provide normal ventilation. The rear edges of the door and frame are cut away or beveled to allow the door to swing open more than 180 degrees from the closed position. The door also includes a sliding latch, an airtight gasket, and spacers between the frame and the cage proper.

Accordingly, it is an object of this invention to provide a door and frame which may be easily mounted on a pet cage to transform the pet cage into a gas tight enclosure.

It is another object of this invention to provide a transparent door and frame for a pet cage whereby the pet may be continuously monitored.

It is a further object of this invention to provide a door and frame for a pet cage having gas inlet and exit ports, apertures, and slidable gas tight covers over said apertures, whereby said pet cage may be converted from a gas tight cage to a ventilated cage.

Other objects, features and advantages of this invention will become apparent from the following detailed description and the appended claims, reference being had to the accompanying drawings forming a part of the specification, wherein like reference numerals designate corresponding parts of the several views.

BRIEF DESCRIPTION OF THE DRAWINGS

FIG. 3 is an exploded view taken along section line 3—3 of FIG. 1 showing the position of spacers between the door frame and an outer surface of the pet cage.

DETAILED DESCRIPTION OF THE PREFERRED EMBODIMENT

Figure 1:
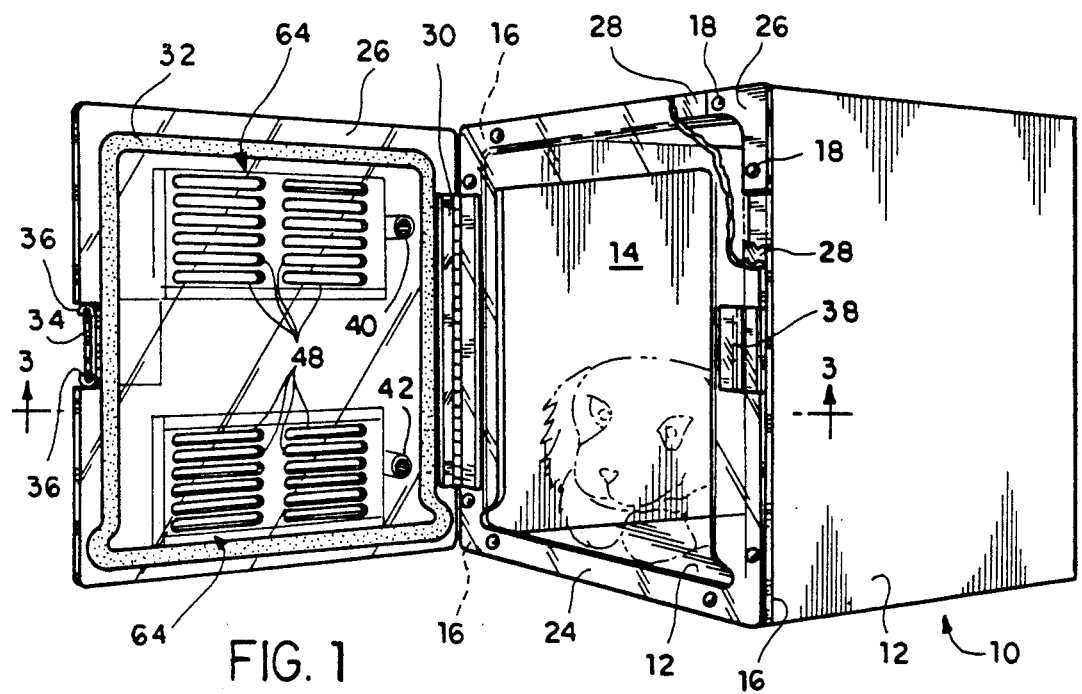
FIG. 1 is a perspective view, partly in section, of the door and frame mounted on a pet cage, the door being in an open position.

Before explaining in detail the present invention, it is to be understood that the invention is not limited in its application to the details of construction and arrangement of parts illustrated in the accompanying drawings, since the invention is capable of other embodiments and of being practiced or carried out in various ways. Also, it is to be understood that the phraseology and terminology employed herein is for the purpose of description and not limitation.

Turning now to the several Figures of the drawing, the pet cage 10 is formed by a plurality of walls 12 having a plurality of flanges 14 extending perpendicular thereto, the flanges 14 being united by right angle corner brackets 16 and screws 18 passing through apertures 20 to mate with nuts 22 on the other side of the flanges 14. This construction provides a box-like arrangement with one open side upon which a frame 24 having a door 26 hinged thereto, can be mounted with the same screws 18 used with the aforesaid corner brackets 16. Both the frame 24 and the door 26 are formed of transparent acrylic plastic material. Located on the door frame 24 are a plurality of spacers 28 configured to fit between the corner brackets 16 to provide an air tight planar surface for frame 24.

Door 26 is mounted on frame 24 by means of an elongated hinge 30 located between the frame 24 and door 26. Disposed on an inner surface of the door 26 is a gasket or seal 32 which tightly engages the frame 24 when door 26 is closed and locked by means of a slidable acrylic latch plate 34, the plate 34 sliding in a channel 36 so as to enable one end of the latch plate 34 to slip under a z-shaped latch bar 38 suitably attached to frame 24.

Figure 2:
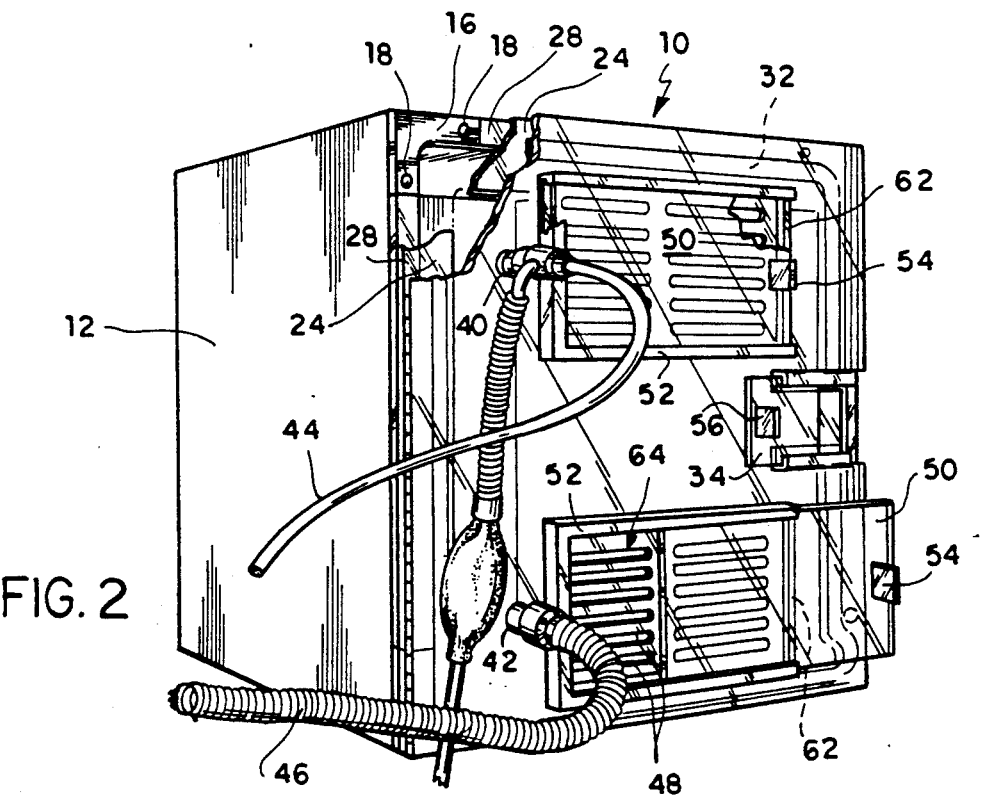
FIG. 2 is a perspective view, partly in section, showing the door in a closed position.

Included on door 26 are two gas ports 40 and 42 through which a selected gas may be introduced into and vented from the inside of the cage 10. As shown in FIG. 2, parts 40 and 42 can be connected to gas hoses 44, 46 as desired.

Also provided on door 26 are two vents 64, each having a plurality of apertures 48, each vent 64 being covered with an airtight sliding acrylic cover plate 50 which slides in a U-shaped channel member 52 and over a spacer 62. Cover plates 50 and latch plate 34 are each provided with a suitable handle 54, 56 whereby the cover plates 50 and latch plate 34 may be shifted.

The edges 58, 60 of the door 26 and frame 24 at the hinge end are cut away so as to enable the door 26 to be opened wider than 180 degrees.

While it will be apparent that the preferred embodiment of the invention herein disclosed is well calculated to fulfill the objects above-stated, it will be appreciated that the invention is susceptible to modification, variation and change without departing from the proper scope or fair meaning of the subjoined claims.

I claim:

1. A door and door frame for a pet cage, said pet cage having side walls, a bottom wall, a top wall and a rear wall, said side walls, said bottom wall and said top wall having front and rear flanges extending perpendicular to the planes of said side walls, said bottom wall and said top wall, said front flanges being joined together by means of first bolts extending through holes in a first set of corner brackets and in said front flanges, said first bolts being held in position by means of first nuts, and said rear wall being joined to said rear flanges by second bolts extending through holes in a second set of corner brackets and in said rear flanges, said second bolts being held in position by second nuts, said door and door frame comprising:

a transparent door connected to a transparent door frame by an elongated hinge, said door frame being mounted on said pet cage over said first set of corner brackets by said first bolts and said first nuts, said door frame having spacers mounted thereon to fill in the spaces between said corner brackets of said first set, said door frame forming a tight seal with said pet cage;

a gas inlet port and a gas outlet port on said door connectable with hoses for the entry and venting of selected gases into and out of said pet cage through said inlet and outlet ports;

at least one vent provided in said door; and a slidable, gas tight vent cover on said door guided by a U-shaped channel and a spacer, said cover including a handle, whereby said at least one vent may be uncovered to transform the cage from a gas tight cage to a ventilated cage.

2. A door and door frame as in claim 1, wherein said door and door frame are formed of acrylic plastics.

3. A door and door frame as in claim 1, further comprising:

a gasket mounted on an inner surface of said door and circumscribing a central opening in said door frame; and a slidable latch on an outer surface of said door engageable with a latch bar on said door frame; whereby when said door is closed and latched, said gasket provides a gas tight seal.

4. A door and door frame as in claim 2, further comprising:

a gasket mounted on an inner surface of said door and circumscribing a central opening in said door frame; and a slidable latch on an outer surface of said door engageable with a latch bar on said door frame; whereby when said door is closed and latched, said gasket provides a gas tight seal.

* * * * *